C. E. AKELEY.
MIRROR AND METHOD OF BACKING THE SAME.
APPLICATION FILED MAR. 19, 1919.
1,384,294.  Patented July 12, 1921.
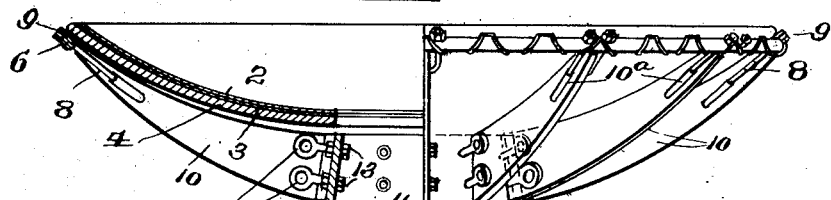
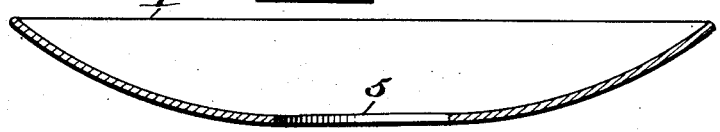
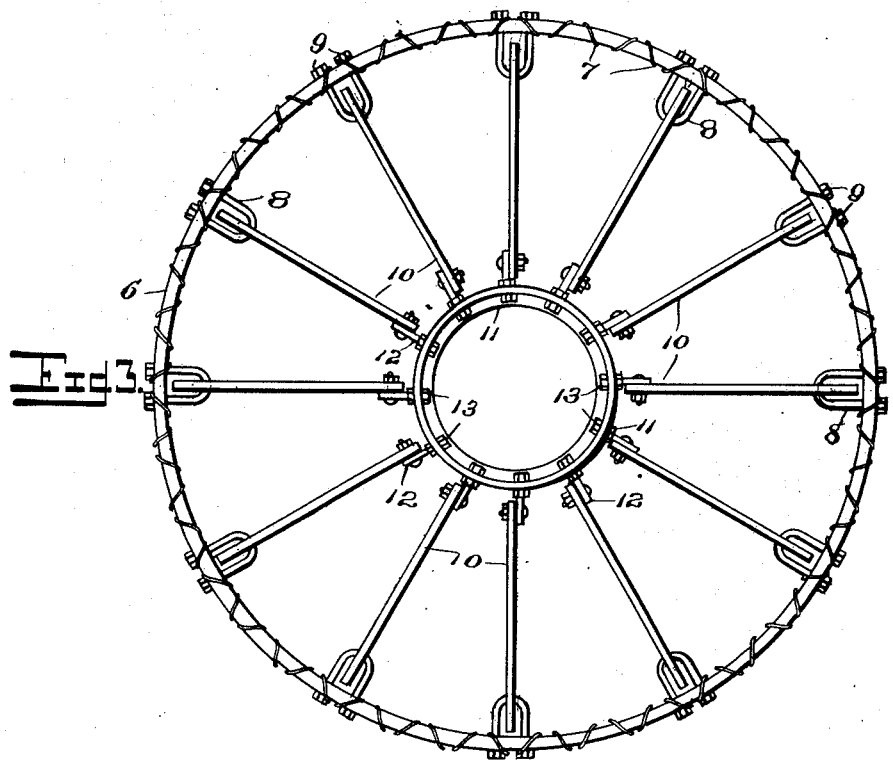
Inventor
Carl E. Akeley

UNITED STATES PATENT OFFICE.

CARL E. AKELEY, OF NEW YORK, N. Y.

MIRROR AND METHOD OF BACKING THE SAME.

1,384,294. Specification of Letters Patent. Patented July 12, 1921.

Application filed March 19, 1919. Serial No. 283,645.

(FILED UNDER THE ACT OF MARCH 3, 1883, 22 STAT. L., 625.)

*To all whom it may concern:*

Be it known that I, CARL E. AKELEY, a citizen of the United States, and a resident of New York city, in the county of New York and State of New York, have invented an Improvement in Mirrors and Method of Backing the Same, of which the following is a specification.

The invention described herein may be used by the Government, or any of its officers or employees in prosecution of work for the Government, or by any other person in the United States without payment of any royalty thereon.

My invention relates to reflectors or mirrors and has for its object to provide a novel means and method of backing the same that is particularly adapted for use in connection with metal mirrors.

Metal mirrors as previously formed have usually comprised a reflecting surface, such as silver, and a base composed of material that may be readily deposited upon the silver, such as copper. The usual method of forming such mirrors is to chemically deposit the silver upon a glass form and then to electrolytically deposit a thin layer of copper thereon, after which, the metal mirror is removed from the glass form.

It is obvious that metal mirrors so formed are much lighter in weight and less expensive than glass mirrors of the same size, since the form for each glass mirror must be carefully ground to insure an optically perfect reflecting surface, whereas, an unlimited number of metal mirrors may be made from a single glass form.

In making metal mirrors of large diameter, however, it has been found that when only a thin base of copper or other metal is provided, the mirror is easily deformed or dented. In order to provide a mirror of sufficient rigidity to be self supporting, it is therefore necessary to deposit the metal base in a very heavy layer, so that the weight and the cost of the mirror are greatly increased and but little advantage is gained over glass mirrors, as previously formed.

By my invention, I provide a novel form and method of backing for metal mirrors by means of which the mirror may be handled without subjecting it to strains that might tend to distort or otherwise damage the reflecting surface.

In the accompanying drawings:

Figure 1 is a view, partially in section and partially in side elevation of a mirror provided with a backing embodying my invention.

Fig. 2 shows the blank form used in producing a metal mirror.

Fig. 3 is a rear elevation of the mirror shown in Fig. 1.

Referring now to the drawings, in order to produce a metal mirror to which my backing may be applied, a blank form 1, having the desired shape and size, is provided, upon which is deposited first a metallic reflecting surface 2, such as silver, and then a layer 3 of dissimilar metal, such as copper. The exact method of depositing the metal forms no part of my invention and need not be further described herein.

A layer 4, preferably of cementitious material, is then formed upon the back of the mirror of sufficient thickness to insure that the mirror will keep its form and will be protected against blows that might dent the metal. It is to be understood that the layer 4 may be applied in any way, as it forms no part of the present invention, although a specific form of cementitious backing is described in my copending patent application, Serial No. 283,644, filed March 19, 1919.

A ring 6 of metal tubing is then placed around the outside periphery of the mirror and is secured thereto by means of wire 7, which passes through holes in the mirror and around the ring 6. A plurality of ribs 10 are secured to the ring 6 by means of U-bolts 8, which engage in slots 10ª in the ribs 10 and pass through the ring 6. The ribs 10 are adapted to be drawn up close against the ring 6 by means of nuts 9 coacting with the threaded ends of the U-bolts 8. The ribs 10 extend radially inward from the ring 6 and are secured to a central hub ring 11 by eye bolts 12 which pass through the ring 11 and are secured on either side thereof by nuts 13.

In adjusting my backing after it has been assembled, the ribs 10 are drawn up close against the ring 6 by means of the nuts 9. The nuts 13 are then adjusted until the ribs 10 are in equal tension and the hub ring 11 is properly centered with respect to the mirror, and is not in contact with the mirror at any point. The mirror and its backing is then removed from the glass form 1 and may be handled without fear of distorting it by reason of the fact that the ring 6 takes all of the strains, whether the mirror be supported by the ring 6 or by the hub 11.

If it is desired to use the mirror in connection with a projector or searchlight, it is apparent from the foregoing, that it may either be supported at several points around the ring 6 or may be supported by means of the hub 11. In either case, any strains will be borne entirely by a rigid trussed structure with its members in tension. The disposition of the hub 11 is of particular advantage, if it should be desired to support some sort of lamp mechanism from the hub and to remove the central portion of the mirror to provide an opening 14. Under any conditions, the mirror itself would not be subjected to any strains inasmuch as it is supported only at its outer periphery by a rigid member.

I claim as my invention:

1. A mirror provided with an annular member secured to the outer edge thereof, a hub, and means for centrally supporting said hub within said annular member and out of contact with said mirror.

2. The method of backing a metal mirror which consists in, first securing an annular member to the outer edge of said mirror, then constructing a wheel structure within said member and offset from the mirror, and finally placing said wheel structure under tension while so offset.

3. The method of backing a mirror which consists in first applying a layer of cementitious material to the mirror, then securing an annular member to the edge of said mirror, constructing a wheel truss structure offset from the mirror, connecting said structure to the annular member and then placing the wheel truss structure under tension.

CARL E. AKELEY.